United States Patent [19]

Collington et al.

[11] 4,183,822

[45] Jan. 15, 1980

[54] BLOWING AGENT COMPOSITION

[75] Inventors: Kenneth T. Collington, St. Heots; Rishi R. Puri; Peter J. Gibson, both of Hauxton, all of England

[73] Assignee: Fisons Limited, London, England

[21] Appl. No.: 870,930

[22] Filed: Jan. 18, 1978

Related U.S. Application Data

[60] Continuation of Ser. No. 744,040, Nov. 22, 1976, abandoned, which is a division of Ser. No. 564,891, Apr. 3, 1975, abandoned.

[30] Foreign Application Priority Data

Apr. 3, 1974 [GB] United Kingdom ............... 14763/74

[51] Int. Cl.$^2$ ........................... C09K 3/30; C08J 9/08
[52] U.S. Cl. ..................................... 252/350; 264/54; 264/DIG. 5; 521/56; 521/92; 521/123; 521/143; 521/183; 521/184; 521/185; 521/189; 521/908; 521/910
[58] Field of Search ..................... 252/350; 260/2.5 R; 264/DIG. 5; 521/56, 908, 910

[56] References Cited

U.S. PATENT DOCUMENTS

| | | | |
|---|---|---|---|
| 2,386,995 | 10/1945 | Wigal | 260/2.5 R |
| 3,466,353 | 9/1969 | Turner | 264/53 |
| 3,639,649 | 2/1972 | McGrath et al. | 260/2.5 N |

FOREIGN PATENT DOCUMENTS

| | | | |
|---|---|---|---|
| 1148119 | 4/1969 | United Kingdom | 260/2.5 R |
| 1227146 | 4/1971 | United Kingdom | 521/85 |
| 1296545 | 11/1972 | United Kingdom | 264/54 |

OTHER PUBLICATIONS

Handbook of Chemistry and Physics, 46th Ed., Chemical Rubber Co., 1965–1966, pp. B160 and B239.

*Primary Examiner*—Richard D. Lovering
*Attorney, Agent, or Firm*—Wenderoth, Lind & Ponack

[57] ABSTRACT

The present invention relates to a process for expanding thermoplastic polymer compositions, notably those containing polymers having processing temperatures in excess of 200° C. and/or containing an ingredient which is susceptible to ammonia, characterized in that as the blowing agent certain carbonates (notably zinc carbonate) are used. Preferably a nucleating agent and a weak acid are present to aid cell formation.

The invention also includes expandable polymer compositions and blowing agent formulations containing the carbonates.

5 Claims, No Drawings

BLOWING AGENT COMPOSITION

This application is a continuation of Ser. No. 744,040, filed Nov. 22, 1976, now abandoned, which in turn is a division of Ser. No. 564,891, filed Apr. 3, 1975, now abandoned.

The present invention relates to a process for expanding thermoplastic polymers and to a composition for use therein.

We have discovered that zinc carbonates and certain other carbonates may be used as blowing agents for the expansion of high temperature processing thermoplastic polymers.

Accordingly, the present invention provides a process for expanding a thermoplastic polymer which comprises heating a composition containing the polymer and a thermally decomposable blowing agent so as to cause decomposition of the blowing agent, characterised in that as primary blowing agent there is used a carbonate, for example, zinc and/or cadmium carbonate.

The term primary blowing agent is used herein to denote that the blowing agent provides at least 50% by volume of the gas evolved upon heating the composition. The primary blowing agent is desirably present in an amount of at least 70%, preferably 90% or more, by weight of the total blowing agent. It is also preferred that the composition to be expanded be substantially free from strong acids (e.g. contain less than 5%, preferably less than 2%, w/w of acid) and that the blowing agent be substantially free (i.e. contain less than 10%) of an ammonia evolving organic blowing agent.

Accordingly, the present invention also provides a process for expanding a thermoplastic polymer which comprises heating, to a temperature below the degradation temperature of the polymer, but in excess of the softening point of the thermoplastic polymer and in excess of the in situ decomposition temperature of the blowing agent, and preferably in excess of 220° C., a composition preferably containing less than 5% added strong acids and less than 10% ammonia-evolving organic blowing agents, which composition contains a thermoplastic polymer and, as blowing agent, a compound selected from particulate zinc carbonate, lead carbonate, cadmium carbonate and/or lithium carbonate.

The invention also provides a storage stable expandable thermoplastic polymer composition comprising a thermoplastic polymer, notably one having a processing temperature in excess of 200° C., and as primary blowing agent a compound selected from zinc carbonate and/or cadmium carbonate. Desirably, the blowing agent in the composition contains less than 20% of other blowing agents, notably ammonia-evolving organic blowing agents. Also in place of or in addition to the zinc and cadmium carbonates, lead and/or lithium carbonates may be used.

The term strong acid as used herein denotes an acid which has a $pK_A$ value of less than 3 for any one of its neutralisation points. The decomposition temperature of the carbonate blowing agent is the temperature at which a gas phase, i.e. water vapour and/or carbon dioxide, is evolved, and is not limited to the temperature at which the $CO_3^{--}$ anion therein is decomposed.

The carbonate blowing agents used in this invention are often commercially available in the form of so called basic carbonates and for convenience the term carbonate is used herein and in the claims to denote, where the context permits, both the carbonate and the basic carbonate. The carbonates may be used in the form of hydrates thereof, $3ZnCO_3.2ZnO.3H_2O$, although with certain polymers (notably polycarbonates) it may be necessary to use substantially anhydrous materials. If desired mixtures of carbonates may be used, although it is preferred to use one carbonate (notably zinc carbonate). It is also preferred that the carbonate provides at least 90% (preferably substantially 100%) by weight of the primary blowing agent in the polymer composition; although the carbonates may be used in conjunction with other non-ammonia blowing agents, e.g. with carbonates such as potassium carbonate which have a lower decomposition temperature.

The blowing agent used in the present invention is particulate and preferably has a particle size of less than 100 micrometers, notably less than 30 micrometers. It is particularly preferred that the particles have a size range of from 0.1 to 20 micrometers. These size ranges are conveniently measured using sieving techniques.

The carbonate blowing agents used in the present invention decompose to give off carbon dioxide. They do not produce ammonia as do many currently commercially available blowing agents nor do they give rise to strongly acidic or basic residues in the expanded thermoplastic polymer. These carbonate blowing agents thus find special use in the expansion of polymer compositions which contain ingredients which are adversely affected by ammonia. The ingredient may be the thermoplastic polymer itself, e.g. a polycarbonate, a polyphenylene sulphide, a polysulphone, a polyamide, a polyester or a polystyrene homopolymer, copolymer, blend or alloy, all being polymers whose physical properties are adversely affected by ammonia and, to a lesser extent water. Alternatively, the ingredient may be a fibre reinforcement in the composition, notably one which has been given an ammonia susceptible surface coating (e.g. a polysiloxane coating) to improve bonding between the fibre and the thermoplastic polymer; or a filler, e.g. asbestos, which is susceptible to ammonia. The carbonates are also of value in that they do not form gases or residues which seriously attack the equipment or moulds in which the polymer compositions are to be expanded. The carbonate blowing agents thus also find use in the expansion of a wide range of high temperature processed polymer compositions which are not susceptible to ammonia.

The thermoplastic polymers for use in the present invention include those which require processing at temperatures in excess of 200° C. and include polycarbonates; polysulphones; polyesters (for example, polyterephthalates); polyamides (for example, polyadipamides e.g. nylon); polyacetals; polyphenylene oxides and sulphides; polystyrenes; poly(acrylonitrile/butadiene/styrene); poly(styrene/acrylonitrile); polyolefins (for example, high density polyethylene or polypropylene) and fluorinated and/or chlorinated ethylene polymers (for example, PTFE and chlorinated ethylene). The polymers may be fibre-reinforced, for example with glass, asbestos, carbon or boron fibres. If desired blends, alloys or copolymers of thermoplastic polymers may be used.

The polymer composition will typically contain from 0.05 to 5%, e.g. 0.2 to 3%, by weight, of the dry carbonate blowing agent based on the weight of the thermoplastic polymer. Where a polymer premix is made, as described below, this may contain from 10 to 50%, e.g.

20 to 30%, by weight of the carbonate blowing agent based on the weight of the polymer.

The polymer composition may contain ingredients other than the polymer and blowing agent; for example, other carbonate blowing agents; dyes; pigments; other polymers; fillers; antioxidants; extenders or fire-retardants. In order to improve the cell structure in the expanded polymer, we prefer that a nucleating agent be present during the decomposition of the blowing agent. The term nucleating agent is used herein to denote a material which aids formation of gas bubbles within the plastic polymer composition during expansion of the composition. Suitable nucleating agents include particulate solids, notably solids with mean particle sizes of less than 100 micrometers; and liquids which are immiscible in any liquid phase within the plastic or molten polymer system. The nucleating agent may be provided by a separate ingredient which is incorporated into the polymer composition with or after the blowing agent. Alternatively, the nucleating agent may be provided by one or more of the ingredients already present in the polymer composition into which the blowing agent is to be incorporated. Thus, suitable nucleating agents may be provided by pigments and/or fillers in the polymer composition and/or by a liquid component such as a wetting agent or metal soap present in the polymer composition as a lubricant. However, it will usually be preferred to incorporate a solid nucleating agent in admixture with the blowing agent. Suitable solid nucleating agents include magnesium and aluminium silicates (for example, talc, or mica); clays (e.g. attapulgite clay, china clay or ball clay); fumed oxides (e.g. fumed silica); or magnesium oxides. Preferably, the solid nucleating agent has a mean particle size of less than 100 micrometers, typically less than 20 micrometers, preferably less than 1 micrometer. It is also within the scope of the present invention to use as nucleating agent a material which is solid when mixed with the blowing agent, but which melts in situ during expansion of the polymer composition. Such materials include waxes and/or organic acids. The use of organic acids is preferred, since these often assist in regulating the decomposition of the blowing agent as well as, in some cases, providing the nucleating agent. The acids for present use are characterised in being weak organic carboxylic acids; i.e. all their neutralisation points have a $pK_A$ greater than 5, typically 5 to 7. Suitable acids include $C_{10-20}$ fatty acids, e.g. palmitic, oleic, lauric, stearic and myristic acids; and aromatic acids.

The nucleating agent is suitably present in from 0 to 50%, preferably from 5 to 30%, by weight of the carbonate blowing agent present or to be incorporated into the polymer composition. Where the nucleating agent is not an acid, it is preferred to incorporate up to 50%, preferably from 5 to 30%, by weight (based on the carbonate blowing agent therein) of a weak acid as described above into the composition being expanded.

Mixtures of solid particulate carbonate blowing agent and nucleating agent are novel and the invention therefore also provides a particulate composition comprising zinc carbonate, lead carbonate, cadmium carbonate and/or lithium carbonate in admixture with a solid nucleating agent, notably fumed oxides, silicates or clays (e.g. magnesium oxide, fumed silica and/or talc). The particulate composition comprises from 5 to 50 parts of nucleating agent per 100 parts by weight of the carbonate. It is also preferred that the particulate composition contain from 5 to 50 parts of a weak acid as described above per 100 parts of weight of the carbonate. If desired, this particulate composition may also include solid diluents (for example, other metal carbonates), liquid diluents (for example paraffins), lubricating agents (for example, metal stearates such as magnesium stearate), antioxidants and the like. Since the carbonate blowing agents used in the present invention do not require the use of a strong acid during expansion of the polymer into which they are incorporated, the blowing agents can be formulated as storage stable mixtures for direct incorporation into the polymer as a single component at the time of use.

The polymer compositions containing the thermoplastic polymer, the carbonate blowing agent and the other ingredients (where present) may be formulated using conventional techniques, e.g. to give granular, powder, emulsion or liquid solution formulations. Thus, the compositions may be made by dry mixing the ingredients or, more preferably by dispersing the carbonate in a liquid carrier and mixing the dispersion into the polymer. If desired, a solid diluent or carrier may be mixed with the carbonate blowing agent to aid uniform distribution thereof throughout the polymer. However, a particularly preferred method is to mix the carbonate blowing agent, optionally with other ingredients (notably a solid nucleating agent), with only part of the thermoplastic polymer or another polymer compatible therewith, to form a concentrated premix which is then mixed with further polymer for use.

The polymer compositions containing the carbonate blowing agent are expanded and moulded in the conventional manner. Thus, the composition may be formed into a sheet by extruding, casting, calendering or spreading as a powder blend. If desired, the layer may be formed on a backing member such as a resinous material, impregnated felt, coated paper and the like. The layer may optionally be overcoated with a protective plastics layer. Alternatively, the composition may be moulded by any of the conventional injection moulding, blow moulding or other moulding techniques to form a hollow or solid article.

The composition is heated in any of the usual ways, such as in hot air ovens or by infra red heaters, preferably to at least 220° C., to decompose the blowing agent and cause expansion of the composition. The optimum temperature for decomposition of the blowing agent will vary with the carbonate used and the other components of the composition. Thus, for zinc carbonate, decomposition temperatures of 220° to 300° C. are generally suitable. The time during which the heating is carried out will of course depend on the temperature and the degree of decomposition required.

The process of the invention will now be illustrated by the following Examples in which all parts and percentages are by weight unless stated otherwise:

EXAMPLE 1

(a) Granular polycarbonate resin of intrinsic viscosity 0.495 (available as LEXAN 900) was tumble mixed with 0.4% blowing agent consisting of a mixture of 85% basic zinc carbonate (mean particle size 15 micrometers) having the general formula $ZnCO_3.2ZnO.3H_2O$, and 15% talc. The mixture was fed to an injection moulding machine fitted with a fixed steel mould. Barrel temperatures were 280° (hopper)/280°/285°/285° C. (nozzle). The total cycle (injection and cooling) time was 70 seconds. The moulding had a density of 0.85 g/cm³, an intrinsic viscosity of 0.450 and a uniform fine cell structure with a smooth surface. The moulding had an impact strength of 4.835 Kg/m as measured on 6.3 cm disc cut from the moulding using the falling weight method with a ball of 2.5 cm diameter. The surface was free from discolouration, indicating a minimum of degradation of the polymer.

(b) By way of comparison, the example was repeated using azodicarbonamide (an ammonia-evolving blowing agent) in place of the zinc carbonate. The cell structure of the product was good but the intrinsic viscosity was about 0.2 (indicating severe degradation). The physical properties of the foam were unsatisfactory, and the polymer was badly discoloured, confirming that polymer was badly degraded.

EXAMPLE 2

Granular poly(acrylonitrile/butadiene/styrene), available from Sterling Moulding Materials Grade B 300, density 1.16/cm$^3$ was tumble mixed with 0.8% of the blowing agent composition described in Example 1(a). The mixture was moulded as in Example 1(a) with barrel temperatures of 225°/260°/260°/260° and a cycle time of 70 seconds. The product moulding had a density of 0.75 g/cm$^3$, a uniform fine cell structure and a stain-free surface.

EXAMPLE 3

(a) Example 2 was repeated using 1.1% of the blowing agent composition described in Example 1(a). The product moulding had a density of 0.69 g/cm$^3$, a fine cell structure and a surface free from discolouration.

(b) By way of comparison the example was repeated using azodicarbonamide in place of the zinc carbonate. The mouldings had a fine cell structure but suffered from dark brown staining.

EXAMPLE 4

Example 2 was repeated using 0.8% zinc carbonate as the blowing agent. The product moulding had a density of 0.82 g/cm$^3$, a good surface and cell structure, although the cell structure was inferior to that obtained in Examples 2 and 3(a).

EXAMPLE 5

(a) Example 2 was repeated using granular 45% asbestos fibre reinforced polypropylene, barrel temperatures of 200°/235°/235°/235° and a cycle time of 66 seconds. The product had a density reduction of 30%, a uniform fine cell structure and a smooth stain-free surface.

(b) By way of comparison the example was repeated using azodicarbonamide in place of the zinc carbonate. The mouldings had a fine cell structure but were stained black.

EXAMPLE 6

Example 2 was repeated using granular 20% glass fibre reinforced polypropylene, barrel temperatures of 200°/235°/235°/235° C. and a cycle time of 66 seconds. The product had a density reduction of 30%, a uniform fine cell structure and a smooth stain-free surface.

EXAMPLE 7

Example 4 was repeated using granular 20% asbestos fibre reinforced polypropylene, barrel temperatures of 200°/235°/235°/235° C. and a cycle time of 66 seconds. The product had a density reduction of about 30%, a good cell structure and a stain-free surface.

EXAMPLE 8

Granular nylon 6 (available as 'Akrulon'; Grade 2 Special), density 1.2 g/cm$^3$ was tumble mixed with 1% of the blowing agent composition described in Example 1(a). The mixture was then moulded as in Example 1 using barrel temperatures of 275°/270°/270°/270° C. and a cycle time of 65 seconds. The moulding had a density of 0.75 g/cm$^3$, a uniform fine cell structure and a smooth stain-free surface.

EXAMPLE 9

Polystyrene (available as 'Shell S173') was tumble mixed with 0.8% of the blowing agent composition of Example 1(a). The mixture was then moulded as in Example 1(a) using barrel temperatures of 190°/220°/220°/220° C. and a cycle time of 70 seconds. The moulding had a density reduction of 23% and a uniform very fine cell structure.

EXAMPLE 10

Granular polycarbonate resin (available as MaKrolon 3200) of intrinsic viscosity 0.531 was tumble mixed with 0.3% of blowing agent as shown in the following table, and injection moulded at barrel temperatures of 280°/280°/285°/285° C. The blowing agent composition and the impact strength and intrinsic viscosity data is tabulated below. The mouldings were 16 cm square plaques 1 cm thick. The impact strengths were measured on 6.3 cm discs cut from the mouldings by the falling weight method using a ball of diameter 2.5 cm.

| BLOWING AGENT | | | | |
|---|---|---|---|---|
| Basic Zinc Carbonate (%) | Talc (%) | Acid (%) | INTRINSIC VISCOSITY | IMPACT STRENGTH Kg/metre |
| 85 | 15 | — | 0.469 | 5.25 |
| 80 | 15 | 5 palmitic | 0.482 | 6.12 |
| 70 | 15 | 15 palmitic | 0.492 | 6.64 |
| 75 | 15 | 10 lauric | 0.479 | 7.11 |
| 75 | 15 | 10 stearic | 0.476 | 6.18 |
| 75 | 15 | 10 trimesic | 0.469 | 6.35 |

EXAMPLE 11

A polymer premix suitable for use as the blowing agent in the polymer of Example 2 was prepared by dry mixing a powdered polyethylene having a low melting point (70 parts) and 30 parts of a mixture of zinc carbonate (75%) talc (15%) and lauric acid (10%). The mixture was then extruded at 110° C. and the extrudate chopped into pellets. The process of Example 2 was repeated using the pellets to provide the blowing agent.

EXAMPLE 12

A thermoplastic composition was prepared by tumble blending together high impact polystyrene granules (available as Shell S173 styrene) with 1% w/w of a blowing composition comprising a mixture of basic zinc carbonate (75%), talc (15%) and lauric acid (10%). The blend was injection moulded with a temperature profile of 180°/220°/230°/230° C., and injection time of 1 second and a mould cooling time of 60 seconds. Mouldings with uniform cell structure and good surface were obtained.

EXAMPLE 13

A thermoplastic composition was prepared with polypropylene (available as Carlona K571) as in Example 12 and was injection moulded with a temperature profile of 220°/240°/240°/240° C. using a one minute cycle.

EXAMPLE 14

A thermoplastic composition was prepared with high density polyethylene (available as Rigidex 50) as per Example 12 and was injection moulded with a temperature profile of 220°/235°/235°/235° C. using a one minute cycle.

EXAMPLE 15

A thermoplastic composition was prepared by tumble blending together Noryl (modified PPO) FN215 granules with 1% w/w of blowing agent consisting of basic zinc carbonate (85%) and talc (15%). The blend was injection moulded with a temperature profile of 260°/275°/275°/275° C. using a one minute cycle.

EXAMPLE 16

(a) A thermoplastic composition was prepared by tumble blending together pre-dried polycarbonate (available as Makrolon 3000 and Lexan FL900) with 0.3% w/w of the blowing agent of Example 15 and injection moulded using a temperature profile of 285°/295°/295°/295° C. A 2% drop in intrinsic viscosity value was recorded.

(b) Under the same condition, azodicarbonamide produced a 50% drop in intrinsic viscosity value.

EXAMPLE 17

A flame retardant grade of polypropylene was tumble mixed with 0.8% w/w of the blowing agent of Example 15 and injection moulded with a temperature profile of 210°/235°/235°/235° C. and a 1 minute cycle.

EXAMPLE 18

A thermoplastic composition was prepared by tumble blending together polyethersulphone (available as 200P from ICI) with 0.7% w/w of the blowing agent of Example 15 and injection moulded with a temperature profile of 330°/330°/330°/350° C. and a cycle time of 50 seconds.

Trihydrazinotriazine, a blowing agent which decomposes to release nitrogen and ammonia, gave mouldings with cracks in them.

EXAMPLE 19

The process of Example 1 was repeated using 0.5% of a mixture of basic cadmium carbonate (Cd $CO_3$.2-CdO.$3H_2O$, 85%) and talc (15%).

EXAMPLE 20

The process of Example 2 was repeated except that the blowing agent consisted of basic zinc carbonate (85%) and potassium carbonate (15%). In this case the product had a slightly finer cell structure than in Example 2.

We claim:

1. A storage stable blowing agent composition which comprises a mixture of 100 parts by weight of a compound selected from the group consisting of zinc carbonate and cadmium carbonate with 5–50 parts by weight of a nucleating agent, with the proviso that if there is an acid present in said composition said acid has a $pK_A$ value greater than 3 for each of its neutralisation points.

2. A composition as claimed in claim 1 which contains less than 10% by weight of ammonia-evolving organic blowing agent.

3. A composition as claimed in claim 1 wherein the nucleating agent is selected from the group consisting of fused oxides, silicates and clays.

4. A composition as claimed in claim 1 which also comprises up to 50% by weight, based on the weight of the carbonate, of an organic carboxylic acid all of whose neutralisation points have a $pK_A$ value of more than 5.

5. A blowing agent composition which comprises a particulate mixture of 100 parts by weight of zinc carbonate and a total of 5–50 parts by weight of one or more members selected from the group consisting of magnesium oxide, silica and talc.

* * * * *